United States Patent Office 3,284,455
Patented Nov. 8, 1966

3,284,455
PHOSPHONIC AND THIONOPHOSPHONIC QUINOLYL ESTERS
Christa Fest, Wuppertal-Elberfeld, and Gerhard Schrader, Wuppertal-Cronenberg, Germany, assignors to Farbenfabriken Bayer Aktiengesellschaft, Leverkusen, Germany, a German corporation
No Drawing. Filed Oct. 11, 1963, Ser. No. 315,673
Claims priority, application Germany, Oct. 17, 1962, F 38,063
10 Claims. (Cl. 260—283)

The present invention relates to and has as its object new and useful insecticidally active phosphorus compounds as well as a process for their production.

More specifically this invention relates to phosphonic or thionophosphonic acid quinolyl esters of the general formula

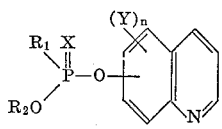

in which $R_1$ stands for an alkyl radical, preferably with 1 to 6 carbon atoms, or an aryl radical optionally substituted by halogen atoms, alkyl, alkoxy and/or alkylmercapto groups, while $R_2$ represents a lower alkyl group, X is an oxygen or sulfur atom, Y denotes halogen atoms and $n$ is an integer from zero to 2.

In accordance with the present invention it has been found that the aforesaid compounds are produced smoothly and in good yields, by reacting alkyl or aryl (thiono)-phosphonic acid-O-alkyl ester halides of the formula

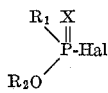

in which the radicals $R_1$, $R_2$ and X have the above-mentioned significance and Hal stands for a halogen atom, with the corresponding hydroxy-quinolines.

The process according to the invention is preferably carried out in the presence of acid-binding agents. Alkali metal carbonates or alcoholates are especially suitable for this purpose. Furthermore it has proved expedient to carry out the reaction in an inert organic solvent and at slightly to moderately elevated temperatures (40 to 70° C.). In this case the products of the process are obtained in very good yields and also with outstanding purity. Solvents which have proved especially valuable are lower aliphatic ketones such as acetone, methyl-ethyl, methyl-isopropyl, and methyl-isobutyl ketones and nitriles e.g. aceto- or propionitrile.

Finally, it is advantageous to continue stirring the reaction mixture for some time (1 to 5 hours) after combining the starting components, while heating it to the stated temperatures, in order to complete the reaction.

The new phosphonic or thionophosphonic acid esters obtainable according to the present invention are mostly colourless to weakly yellow coloured oils, distillable under strongly reduced pressure without decomposition. They are insoluble in water, but often soluble in dilute acids.

The new compounds of the present invention very effectively kill insects like aphids, spider mites, caterpillars, flies, ticks, etc. They distinguish themselves especially by a good contact- insecticidal activity and mostly also by a systemic action. At the same time they have an activity on eating insects such as caterpillars. Most surprisingly they are of remarkably low toxicity against mammals. They may be used in the same manner as other known phosphoric insecticides, i.e. in a concentration from about 0.00001% to about 1%, diluted or extended with suitable solid or liquid carriers or diluents. Examples of such solid carriers are talc, chalk, bentonite, clay and the like, as liquid carriers there may be mentioned water (if necessary with commercial emulsifiers), alcohols, especially lower alcohols such as methanol or ethanol, ketones, especially lower ketones such as acetone or methyl ethyl ketone, liquid hydrocarbons and the like. The new compounds may furthermore be used in combination with each other or with known insecticides, fertilizers, etc.

As examples for the special utility the inventive compounds of the following formulae I)
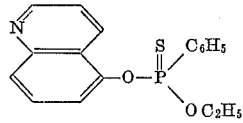

(II)
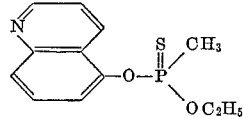

(III)
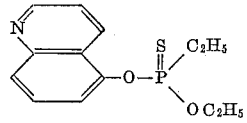

have been tested against aphids (Compound II), spider mites (Compounds I, II and III), caterpillars (Compounds I and II), ticks (Compounds I and III) and mosquito larvae (Compound III).

Aqueous dilutions of these compounds have been prepared by mixing the active ingredients with the same amounts of dimethyl formamide as an auxiliary solvent adding thereto 20% by weight referred to active ingredient of a commercial emulsifier consisting of a benzyl hydroxy polyglycol ether containing about 10 to 15 glycol ethers, and diluting this premixture at last with water to the desired concentration indicated in the following paragraphs:

The tests have been carried out as follows:

(a) Against aphids (species *Doralis fabae*): heavily infested bean plants (*Vicia faba*) have been sprayed drip wet with solutions as prepared above. The effect has been determined after 24 hours by counting the dead pests either on the surface of the soil or still remaining on the plants.

The following results have been obtained:

| Compound | Aqueous concentration (in percent active ingredient/water) | Killing rate (in percent) |
|---|---|---|
| II | 0.01 | 100 |

(b) Against spider mites: Bean plants (*Phaseolus vulgaris*) of about 15 inches height are sprayed drip wet with solutions as prepared above and in a concentration as shown below. The bean plants have been infested heavily with the two-spotted spider (species *Tetranychus telarius*). Evaluation has been carried out after 24 hours, 48 hours and 8 days. The following results have been obtained:

| Compound | Aqueous concentration (in percent active ingredient/water) | Killing rate (in percent) |
|---|---|---|
| I | 0.001 | 100 |
| II | 0.001 | 100 |
| III | 0.01 | 80 |

(c) Against caterpillars of the type diamond black moth (*Plutella maculipennis*): white cabbage has been sprayed drip wet with aqueous emulsions as prepared above in a concentration as shown below. Caterpillars (10 each) have been placed on the sprayed leaves of the white cabbage. The living status has been determined after 24 and 48 hours.

The following results have obtained:

| Compound | Aqueous concentration (in percent active ingredient/water) | Killing rate (in percent) |
|---|---|---|
| I | 0.01 | 100 |
| II | 0.01 | 100 |

(d) Against ticks: about 50 American catal ticks (adult female ticks of the type *Boophilus microplus*) are dipped for 1 minute into diluted aqueous emulsions prepared as described above. Evaluation occurred after 48 hours. The results are to be seen from the following table:

| Compound | Concentration (in percent active ingredient/water) | Killing rate (in percent) |
|---|---|---|
| I | 0.00005 | 25 |
| III | 0.005 | 25 |

(e) Against mosquito larvae of the type *Aedes aegypti*: about 20 larvae were brought into diluted aqueous emulsions prepared as described above. Counting of the dead pests occurred after 24 hours. The following results have been obtained:

| Compound | Aqueous concentration (in percent active ingredient/water) | Killing rate (in percent) |
|---|---|---|
| III | 0.0001 | 100 |

As already mentioned above the inventive compounds possess outstanding insecticidal and acaricidal properties; they are especially distinguished by a very strong activity against ticks and other insect pests affecting large animals. In contrast, the phosphorus-containing derivatives of hydroxyquinolines, analogous in structure to the products of the process, and known from British patent specification No. 654,791, show no acaricidal activity at all and only a very weak insecticidal activity. This surprising technical superiority of the phosphonic or thionophosphonic acid esters of the invention is shown in the following table.

| Compound | Acaricidal activity when applied again t ticks | |
|---|---|---|
| | Aqueous concentration (in percent active ingredient/water) | Killing rate (in percent) |
| 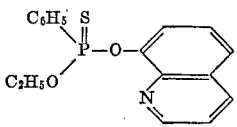 (According to invention, Example 2.) | 0.0005 | 50 |
| 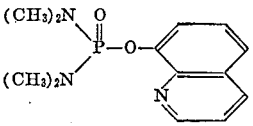 (Known from British patent Specification No. 654,791.) | 0.1 | 0 |

It is apparent from the above results of comparative showings, that the compound according to the invention achieves still a 50% destruction of the ticks even when it is administered in very strong dilutions, whereas the known comparison compound of analogous structure proves completely inactive against the specified pests even in a concentration several powers of ten greater.

On account of their outstanding pesticidal properties, the inventive phosphonic or thionophosphonic acid esters are applicable as pest control agents primarily in plant protection but also in veterinary medicine.

*Example 1*

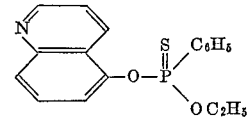

60 g. (0.4 mol) of 5-hydroxyquinoline and 56 g. (0.4 mol) of dry and sieved potassium carbonate are suspended in 200 cc. of acetonitrile. This suspension is heated to 50° C. and 88 g. (0.4 mol) of phenyl-thionophosphonic acid-O-ethyl ester chloride are then added dropwise with stirring to the reaction mixture. The reaction proceeds exothermically. After the reaction has subsided, the mixture is heated at 65° C. for a further 4 hours, then poured into 300 cc. of icewater, and the separated oil is taken up in 200 cc. of benzene. The benzene solution obtained is dried over sodium sulphate. The solvent is then removed in vacuum. After removing the volatile parts under highly reduced pressure, there are obtained 76 g. (57% of the theoretical) of phenylthionophosphonic acid-O-ethyl-O-(5-quinolyl) ester in the form of a brown oil soluble in dilute acids.

*Analysis.*—Calculated for a mol weight of 329: N, 4.26%; P, 9.42%. Found: N, 4.57%; P, 9.11%.

On rats per os the mean toxicity ($DL_{50}$) of the compound amounts to 50 mg./kg. of animal weight.

Caterpillars are killed to an extent of 100% by 0.01%, and spider mites by 0.001% solutions of the compound. Ticks can be destroyed up to about 25% by 0.00005% solutions.

*Example 2*

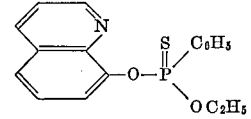

A suspension of 60 g. (0.4 mol) of 8-hydroxyquinoline and 56 g. dry and sieved potassium carbonate in 200 cc. of methyl ethyl ketone is heated to 50° C., and then 88 g. (0.4 mol) of phenyl-thionophosphonic acid-O-ethyl ester chloride are added dropwise to the mixture with vigorous stirring. After the exothermic reaction has subsided, the mixture is heated to 60° C. for a further 3 hours and then worked up as described in Example 1. There are obtained 70 g. (53% of the theoretical) of phenyl-thionophosphonic acid - O - ethyl-O-(8-quinolyl) ester as a water-insoluble, pale brown oil.

*Analysis.*—Calculated for a mol weight of 329: N, 4.26%; P, 9.43%. Found: N, 4.68%; P, 8.78%.

Ticks are destroyed up to about 50% by 0.0005% solutions of the compound and spider mites are killed 90% by 0.001% solutions.

*Example 3*

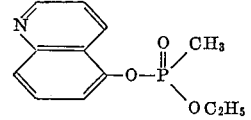

60 g. (0.4 mol) of 5-hydroxyquinoline are dissolved or suspended together with 56 g. of dry and sieved potassium carbonate in 200 cc. of methyl ethyl ketone. Subsequently the mixture is heated to 50° C. and then 57 g. (0.4 mol) of methylphosphonic acid-O-ethyl ester chloride are added with vigorous stirring. The reaction mixture is then heated at 60° C. for 4 hours, poured into 300 cc. of ice-water, and the separated oil is taken up in 200 cc. of methylene chloride. The methylene chloride solution is dried over sodium sulphate and the solvent finally distilled off in vacuum. The residue is rectified in high vacuum. The product distills under a presure of 0.05 mm. Hg at 130° C. As distillate, 40 g. (40% of the theoretical) of methylphosphonic acid-O-ethyl-O-(5-quinolyl) ester are obtained in the form of a water-insoluble yellow oil.

The mean toxicity ($DL_{50}$) of the compound on rats per os amounts to 30 mg./kg. of animal weight. 0.05 solutions of the preparation kill ticks up to an extent of about 40%. Spider mites are killed 50% and aphids 90% by 0.001% solutions of the ester.

*Example 4*

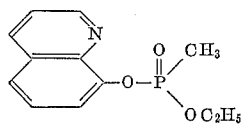

Under reaction conditions analogous to those described in the preceding examples, there is obtained from 60 g. of 8-hydroxyquinoline and 57 g. methyl-phosphonic acid-O-ethyl ester chloride, the methyl-phosphonic acid-O-ethyl-O-(8-quinolyl) ester of B.P. 128° C. at a pressure of 0.03 mm. Hg. The yield amounts to 40 g. (40% of the theoretical).

Aphids are completely destroyed by 0.1% solutions of the compound.

*Example 5*

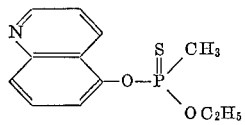

60 g. (0.4 mol) of 5-hydroxy-quinoline are suspended together with 56 g. of potassium carbonate in 150 cc. of acetonitrile, this suspension is heated to 50° C. and then treated dropwise at this temperature while stirring with 64 g. (0.4 mol) of methyl-thionophosphonic acid-O-ethyl ester chloride. After the exothermic reaction has subsided, the mixture is heated for another hour at 65 to 70° C., and then worked up as described in the preceding examples. 67 g. of methyl-thionophosphonic acid-O-ethyl-O-(5-quinolyl) ester are obtained as a yellow, scarcely water-soluble oil of B.P. 125° C. at 0.01 mm. Hg. The new compound is soluble in dilute acids.

The mean toxicity ($DL_{50}$) of the compound on rats per os amounts to 43 mg./kg. of animal weight.

0.01% solutions of the product kill caterpillars and aphids to 100%. Spider mites are still destroyed with certainty by 0.001% solutions.

*Example 6*

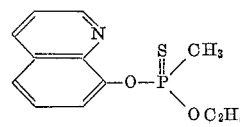

A suspension of 60 g. (0.4 mol) of 8-hydroxy-quinoline and 56 g. of potassium carbonate in 150 cc. of methyl ethyl ketone is heated to 50° C. and then mixed dropwise with vigorous stirring, with 64 g. (0.4 mol) of methyl-thionophosphonic acid-O-ethyl-ester chloride. After the exothermic reaction has subsided, the reaction mixture is is further heated at 60 to 70° C. for 3 hours, then cooled to room temperature and poured into 300 cc. of icewater. The separated oil is taken up in benzene, and the benzene solution is dried over sodium sulphate. The solvent is finally evaporated in vacuum. As residue there are obtained 45 g. (42% of the theoretical) of methyl-thionophosphonic acid-O-ethyl-O-(8-quinolyl) ester of B.P. 132° C. at 0.07 mm. Hg.

Spider mites are killed 70% by 0.01% solutions and ticks are destroyed 75% by 0.025% solutions of the ester.

*Example 7*

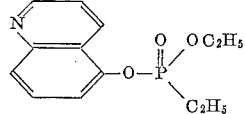

60 g. (0.4 mol) of 5-hydroxy-quinoline are suspended together with 56 g. of potassium carbonate in 150 cc. of methyl ethyl ketone. To this suspension there are added with stirring, at 50° C., 64 g. (0.4 mol) of ethyl-phosphonic acid-O-ethyl ester chloride. The reaction mixture is then heated at 65 to 70° C. for a further 4 hours while stirring, and then worked up as repeatedly described. The ethylphosphonic acid-O-ethyl-O-(5-quinolyl) ester is obtained in the form of a water-insoluble oil, which distills at 131 to 132° C. at a pressure of 0.07 mm. Hg.

The yield amounts to 50 g. (49% of the theoretical). Spider mites are completely destroyed by 0.01% solutions of the ester.

*Example 8*

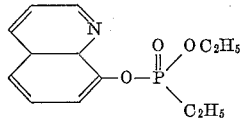

In an analogous manner as described in the preceding examples, there are obtained from 60 g. of 8-hydroxy-quinoline and 64 g. of ethyl-phosphonic acid-O-ethyl ester chloride, 40 g. (39.2% of the theoretical) of ethyl-phosphonic acid-O-ethyl-O-(8-quinolyl) ester of B.P. 130° C. at 0.03 mm. Hg. Larvae of flies are killed 100% by 0.1% solutions of the compound.

*Example 9*

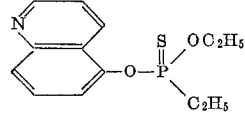

60 g. (0.4 mol) of 5-hydroxy-quinoline and 56 g. of potassium carbonate are suspended in 150 cc. of methyl ethyl ketone, 69 g. (0.4 mol) of ethyl-thiono-phosphonic acid-O-ethyl ester chloride are added to this suspension at 50° C. with vigorous stirring, and the mixture is then heated at 65° C. with further stirring for a further 3 hours. The reaction mixture is then worked up as described in the preceding examples. 35 g. (31% of the theoretical) of ethyl-thionophosphonic acid-O-ethyl-O-(5-quinolyl) ester are obtained in the form of a water-insoluble oil, which distills at a pressure of 0.05 mm. Hg at 115° C.

Ticks are killed up to 25% by 0.005% solutions and spider mites to 80% by 0.01% solutions of the compound. Mosquito larvae are completely destroyed even by 0.0001% solutions.

*Example 10*

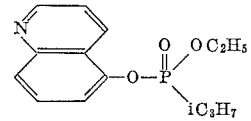

68 g. (0.4 mol) of isopropyl-phosphonic acid-O-ethyl ester chloride are added dropwise at 55° C. with stirring to a suspension of 60 g. (0.4 mol) of 5-hydroxy-quinoline and 56 g. of dry and powdered potassium carbonate in 150 cc. of methyl ethyl ketone, then the reaction mixture is heated to 60° C. for a further 2 hours and then worked up as repeatedly described above. 50 g. (44% of the theoretical) of isopropyl phosphonic acid-O-ethyl-O-(5-quinolyl) ester are obtained in the form of a water-insoluble colourless oil of B.P. 145 to 150° C. at 0.3 mm. Hg.

Spider mites are killed 100% by 0.01% solutions of the ester.

*Example 11*

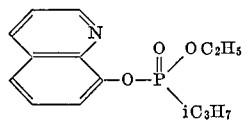

60 g. (0.4 mol) of 8-hydroxyquinoline are suspended together with 56 g. of dry and sieved potassium carbonate in 150 cc. of methyl ethyl ketone. To this suspension there are added dropwise at 50° C. 68 g. (0.4 mol) of isopropyl-phosphonic acid-O-ethyl ester chloride, subsequently the reaction mixture is heated at 65° C. for 3 to 4 hours and then worked up as described in the preceding examples. 60 g. (53% of the theoretical) of isopropyl-phosphonic acid-O-ethyl-O-(8-quinolyl) ester are obtained as a water-insoluble colourless oil of B.P. 126° C. at 0.04 mm. Hg.

*Example 12*

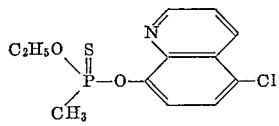

A solution of 90 g. (0.5 mol) of 5-chloro-8-hydroxyquinoline in 500 cc. of acetonitrile is first treated with 80 g. of potassium carbonate and then are added dropwise at 60 to 70° C. while stirring 80 g. (0.5 mol) of methyl-thionophosphonic acid-O-ethyl ester chloride. The reaction mixture is heated to 75 to 80° C. for a further 2 hours and then poured into 400 cc. of ice-water. The separated oil is taken up in 400 cc. of benzene, the benzene solution is washed with water and dried over sodium sulphate. After distilling off the solvent, 74 g. (49% of the theoretical) of methyl-thionophosphonic acid-O-ethyl-O-(5-chloro-8-quinolyl) ester are obtained in the form of a pale yellow oil which rapidly solidifies in crystalline form. After recrystallisation from ligroin the compound melts at 64° C.

On rats per os the product possesses a mean toxicity of 85 mg./kg. of animal weight.

0.01% solutions of the compound kill aphids to an extent of 100% and spider mites are destroyed 90% even by 0.001% solutions.

*Example 13*

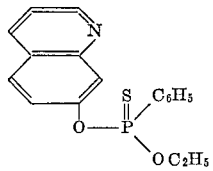

25 g. (0.173 mol) of 7-hydroxyquinoline are suspended together with 24 g. (0.173 mol) of potassium carbonate in 100 cc. of methyl ethyl ketone and 38 g. (0.173 mol) of phenyl-thionophosphonic-acid-O-ethyl ester chloride are added dropwise at 55° C. to this suspension. After the exothermal reaction has subsided the mixture is heated for 5 hours to 60 to 65° C. and then stirred for several hours in the cold. Subsequently the reaction mixture is poured into about 200 cc. of water, then taken up in 200 cc. of benzene and the benzenic solution is dried over sodium sulphate. Finally the solvent is evaporated in vacuum and the residue is treated under highly reduced pressure. There are obtained 30 g. (52% of the theoretical) of phenyl-thionophosphonic acid - O - ethyl - O - (7-quinolyl)-ester in the form of a brown water-insoluble oil. The mean toxicity of the compound on rats per os amounts to 25 to 50 mg. per kg. of animal weight. Ticks are killed 65% even by 0.0001% solutions of the product.

*Example 14*

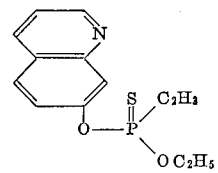

In an analogous manner as described in Example 13 there are obtained from equimolar amounts of 7-hydroxyquinoline and methyl-thiono-phosphonic acid-O-ethyl ester chloride 50 g. (47% of the theoretical) of methyl-thionophosphonic acid-O-ethyl-O-(7-quinolyl)ester.

*Analysis.*—Calculated for a molecular weight of 267: N, 5.25%; P, 11.6%; S, 12.75%. Found: N, 5.24%; P, 11.88%; S, 11.87%.

On rats per os the mean toxicity ($DL_{50}$) of the compound amounts to 10 mg./kg. of animal weight. Spider mites are completely destroyed by 0.0001% solutions of the product.

*Example 15*

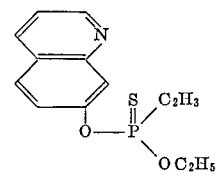

In an analogous manner as described in the preceding examples there are obtained from equimolar amounts of 7-hydroxy-quinoline and ethyl-thiono-phosphonic acid-O-ethyl ester chloride 86 g. (76.5% of the theoretical) of ethyl-thionophosphonic acid-O-ethyl-O-(7-quinolyl) ester.

*Analysis.*—Calculated for a molecular weight of 281: N, 4.98%; S, 11.4%; P, 11.02%. Found: N, 4.61%; S, 10.7%; P, 12.28%.

On rats per os the mean toxicity ($DL_{50}$) of the compound amounts to about 20 mg./kg. of animal weight. Aphids and caterpillars are killed 100% by 0.01% solutions of the product.

*Example 16*

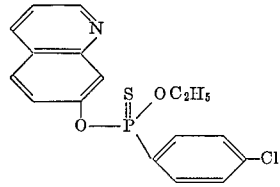

The 4-chlorophenyl-thionophosphonic acid-O-ethyl-O-(7-quinolyl) ester can be produced in an analogous manner as described in Example 13 from equimolar amounts of 7-hydroxy-quinoline and 4-chlorophenylthionophosphonic acid-O-ethyl ester chloride. The yield amounts to 80 g. (55% of the theoretical).

*Analysis.*—Calculated for a molecular weight of 363.5: N, 3.85%; P, 8.54%. S, 8.82%; Cl, 9.80%. Found: N, 3.17%; P, 9.90%; S, 8.85%; Cl, 10.85%.

Upon administration on rats per os the compound shows a mean toxicity ($DL_{50}$) of about 750 mg./kg. of animal weight. Grain weevils are killed with certainty by 0.01% solutions of the product.

*Example 17*

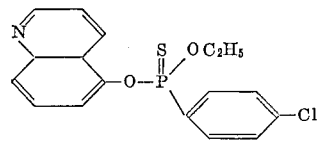

In the same way as described in the preceding examples the 4-chlorophenyl - thionophosphonic acid-O-ethyl-O-(5-quinolyl) ester may be produced by reacting equimolar amounts of 5-hydroxy - quinoline and 4-chlorophenyl - thionophosphonic acid-O-ethyl-ester chloride. The yield amounts to 80 g. (55% of the theoretical).

*Analysis.*—Calculated for a molecular weight of 363.5: N, 3.85%; P, 8.54%; S, 8.82%; Cl, 9.80%. Found: N, 3.96%; P, 8.64%; S, 8.43%; Cl, 9.70%.

On rats per os the compounds possesses a mean toxicity of about 100 mg./kg. of animal weight. Spider mites and caterpillars are killed 100% by 0.01% solutions of the product.

*Example 18*

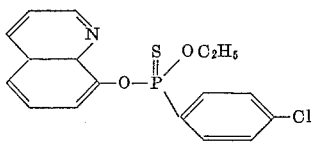

In an analogous manner as described in the preceding examples there are obtained from the equimolar amounts of 8-hydroxy-quinoline and 4-chloro-phenyl-thionophosphonic acid-O-ethyl ester chloride 88 g. (61% of the theoretical) of 4-chlorophenyl-thionophosphonic acid-O-ethyl-O-(8-quinolyl) ester.

*Analysis.*—Calculated for a molecular weight of 363.5: N, 3.85%; P, 8.54%; S, 8.82%; Cl, 9.80%. Found: N, 3.51%; P, 9.62%; S, 9.24%; Cl 10.10%.

On rats per os the mean toxicity ($DL_{50}$) of the compound amounts to about 750 mg./kg. of animal weight. Caterpillars are killed 100% by 0.01% solutions of the product.

We claim:

1. A compound of the formula

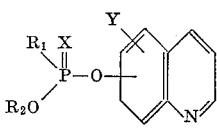

in which $R_1$ is a member selected from the group consisting of lower alkyl up to 4 carbon atoms, phenyl and chlorophenyl, $R_2$ is lower alkyl having up to 4 carbon atoms, X is a member selected from the group consisting of oxygen and sulfur and Y is a member selected from the group consisting of hydrogen and halogen.

2. A compound of the formula

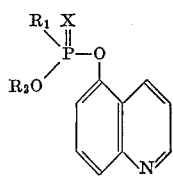

in which $R_1$ is a member selected from the group consisting of lower alkyl up to 4 carbon atoms, phenyl and chlorophenyl, $R_2$ is lower alkyl having up to 4 carbon atoms and X is a member selected from the group consisting of oxygen and sulfur.

3. A compound of the formula

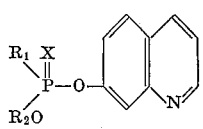

in which $R_1$ is a member selected from the group consisting of lower alkyl up to 4 carbon atoms, phenyl and chlorophenyl, $R_2$ is lower alkyl having up to 4 carbon atoms and X is a member selected from the group consisting of oxygen and sulfur.

4. A compound of the formula

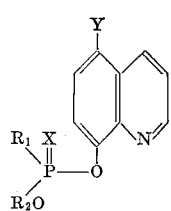

in which $R_1$ is a member selected from the group consisting of lower alkyl up to 4 carbon atoms, phenyl and chlorophenyl, $R_2$ is lower alkyl having up to 4 carbon atoms, X is a member selected from the group consisting of oxygen and sulfur and Y is a member selected from the group consisting of hydrogen and halogen.

5. The compound of the formula

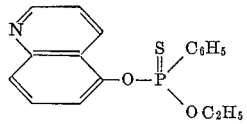

6. The compound of the formula

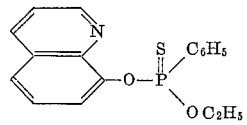

7. The compound of the formula

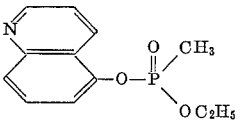

8. The compound of the formula

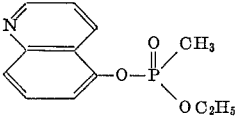

9. The compound of the formula

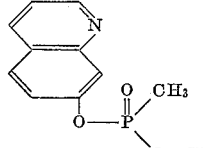

10. The compound of the formula

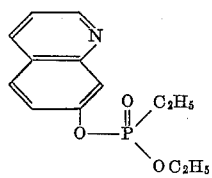

References Cited by the Examiner

UNITED STATES PATENTS

| 2,686,783 | 8/1954 | Morrisson et al. | 260—286 |
| 2,852,513 | 9/1958 | Schrader et al. | 260—247.1 |
| 3,067,210 | 12/1962 | Schrader | 260—461.110 |
| 3,151,146 | 10/1964 | Schrader et al. | 260—461.110 |

FOREIGN PATENTS

| 184,580 | 2/1956 | Australia. |
| 1,261,256 | 4/1961 | France. |

ALEX MAZEL, *Primary Examiner.*

HENRY R. JILES, *Examiner.*

DONALD G. DAUS, *Assistant Examiner.*